June 5, 1945.  R. T. WILLIAMS  2,377,596
BATTERY CHARGING SYSTEM
Filed Jan. 2, 1943  3 Sheets-Sheet 2

*INVENTOR.*
RALPH T. WILLIAMS
BY
ATTORNEY

June 5, 1945.   R. T. WILLIAMS   2,377,596
BATTERY CHARGING SYSTEM
Filed Jan. 2, 1943   3 Sheets-Sheet 3
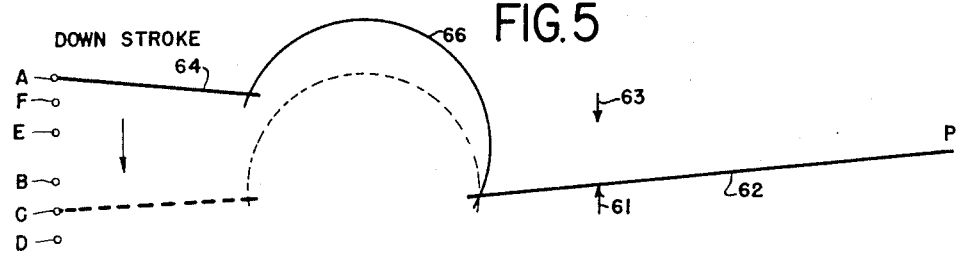
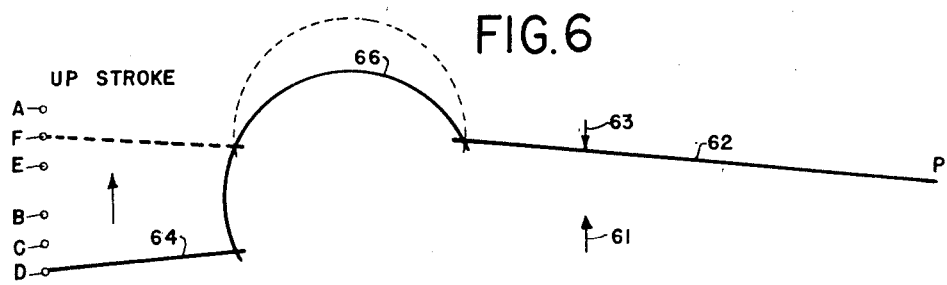
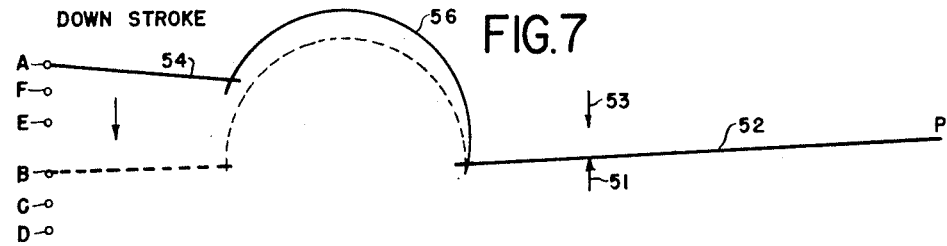
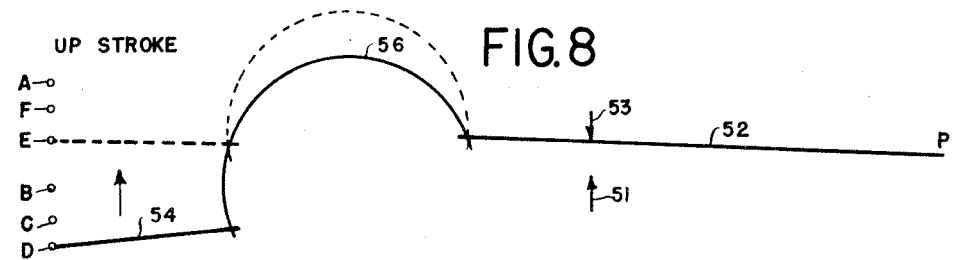
INVENTOR.
RALPH T. WILLIAMS
BY
ATTORNEY Patented June 5, 1945

2,377,596

UNITED STATES PATENT OFFICE 2,377,596

BATTERY CHARGING SYSTEM

Ralph T. Williams, Chicago, Ill., assignor to Automatic Electric Laboratories, Inc., a corporation of Delaware Application January 2, 1943, Serial No. 471,123

7 Claims. (Cl. 320—40)

This invention relates to electrical control systems and more particularly to a new and improved automatic voltage control system for use in a battery charging system.

The object of the invention is to provide improved automatic means for controlling the charging of storage batteries and for maintaining the battery voltage within very close predetermined battery voltage limits.

Another object of the invention is to provide an improved single electro-magnetic means and circuits controlled thereby for maintaining the battery voltage within certain predetermined limits.

A further object of the invention is to provide resistors having suitable temperature coefficients of resistance for compensating for the temperature coefficient of resistance of the magnet winding and for compensating for the change in temperature of the storage battery.

Heretofore, it was commercially impractical to use a single electro-magnet, or a relay, for controlling its own circuit to respond to both predetermined high and low battery voltages and also for directly closing and opening the circuit to the battery charging means. The main reason for the above being that the spring contacts of such a magnet, or relay, had a tendency to float and intermittently make and break circuits at critical battery voltages. When the spring contacts intermittently closed and opened circuits of a fairly high voltage, considerable sparking and burning of the contacts took place, resulting, eventually, in failure of the required circuit operations. Also, these rapid interruptions, at the spring contacts at critical voltages, repeatedly closed and opened operating circuits a plurality of times at a time when only one circuit closure, or circuit opening, was required. Such repeated circuit closures caused undesired operations or failure of the apparatus to function properly. Accordingly another object of the invention is to provide a combined high-low electro-magnet with snap-acting spring contacts of the toggle type to control its own operating circuits and to directly control the charging circuit in accordance with predetermined battery voltages.

An additional feature relates to the provision of a combined high-low electro-magnet with snap-acting spring contacts of the toggle type to control its own operating circuits so as to operate its armature to different predetermined positions in accordance with different predetermined battery voltages, to directly control the start and stop battery charge circuits, and to directly control at an intermediate predetermined position of the armature a reduction in the rate of charge.

The above objects and other features of the invention will be apparent from the following detailed description of the invention.

Referring now to the drawings, comprising Figs. 1 to 8, inclusive, there is shown by means of the usual mechanical and circuit diagrams sufficient of the apparatus in a battery charging system to enable the invention to be readily understood.

Figure 1:
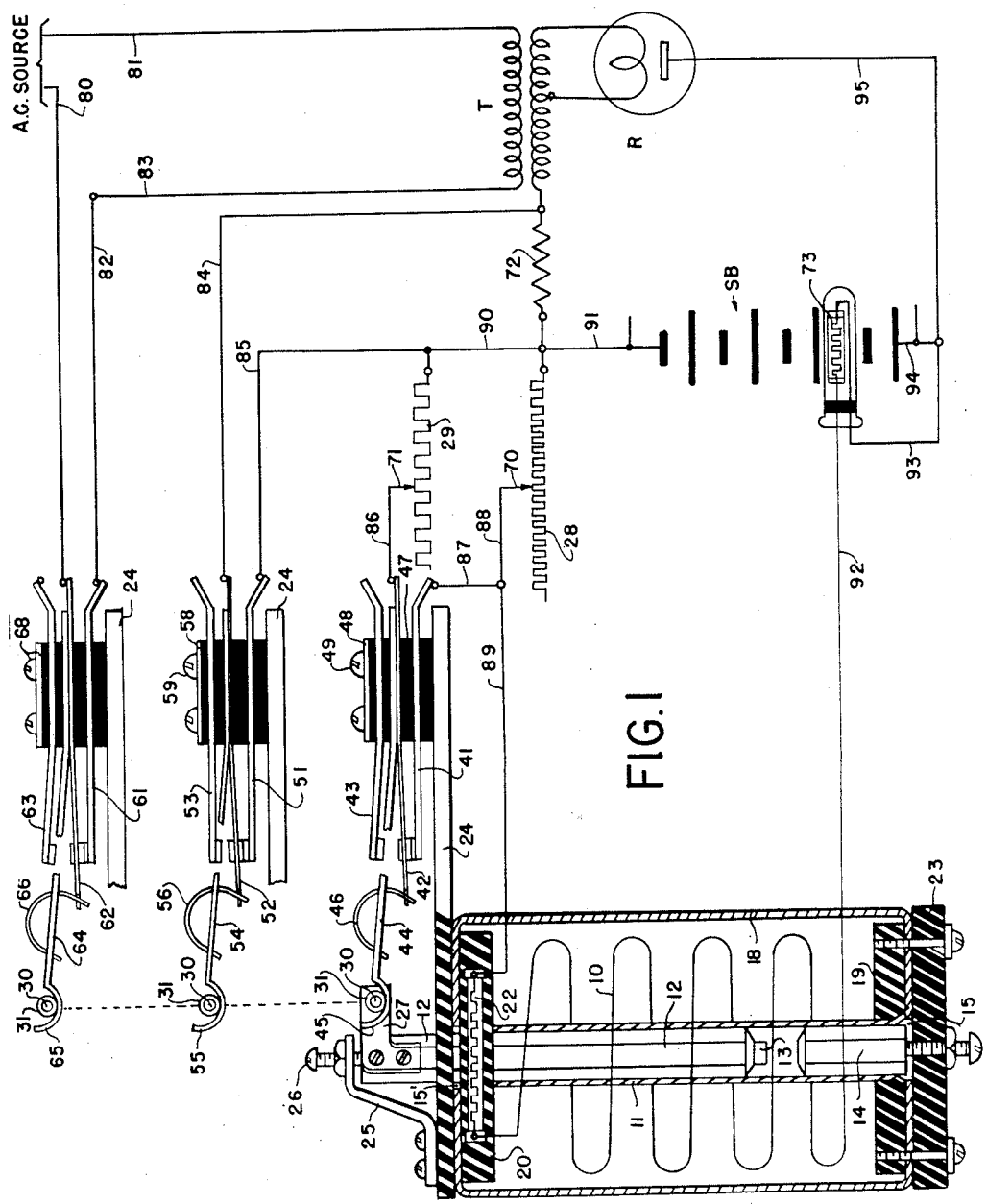
Fig. 1 shows the circuits and apparatus of a battery charging system in accordance with the present invention.

Figs. 5 to 8, inclusive, show enlarged diagrams illustrating diagrammatically the predetermined armature positions in which the snap-acting springs snap from one position to another.

The mechanical construction of the battery voltage responsive relay, or magnet, will first be described in connection with Figs. 2, 3 and 4. This magnet, as illustrated, is of the solenoid type and is equipped with three sets of snap-acting toggle type spring contacts which are controlled by the armature, or solenoid plunger, in different predetermined positions during the movement of the armature.

A winding 10 is wound on the spool comprising a brass circular tube 11 and insulator spool heads 19 and 20. An iron hexagonally-shaped plunger 12 is movably positioned within the tube 11 and is provided with a brass residual 13 at its lower end. The plunger is hexagonally-shaped in order to reduce the friction between the plunger 12 and tube 11. The plunger 12 at its upper end is provided with extension arms 27 for firmly securing the armature rod 30 to the plunger 12. Insulating sleeves 31 are loosely mounted on the armature rod 30 for operating the movable armature springs, such as 44, 54 and 64 of the respective snap-acting springs sets, when the armature rod 30 and plunger 12 is operated. An adjustable stationary iron core 14 is inserted within the lower portion of the tube 11. A pair of U-shaped iron members 18 are secured to the magnet between the insulating base 24 and insulating bar 23 by means of screws, such as screws 16. The turned ends of the U-shaped members 18 extend inwardly, as shown in Fig. 3, to close proximity to the iron core 14 at the lower portion of the magnet and to close proximity to the plunger 12 at the upper portion of the magnet. Small air gaps 15 and 15' are shown separating the magnetic circuit. This magnetic circuit may be traced from the iron core 14 through the air gap 15, which may be adjusted by screw 17, to the U-shaped iron side members 18 up to the upper portion of the magnet and through the air gap 15' to plunger 12 and thence through the air gap separating the plunger 12 and core 14. The residual 13 prevents the plunger 12 from being held to the core 14 by residual magnetism.

A bracket 25 having an adjusting screw 26, is mounted on the insulating base 24 for limiting the stroke of the armature, or plunger 12. A pair of adjustable resistors 28 and 29 are also mounted on the base 24 and are provided with sliding contacts 70 and 71 for securing the desired resistance value in the circuits shown in Fig. 1.

A negative temperature coefficient resistor 22 is mounted in the hole 21 in the spool head insulator 20 for the purpose of compensating for the change in resistance of the relay winding 10 due to temperature changes.

Three sets of snap-acting toggle type spring contacts are mounted on the base 24. These sets of spring contacts are similar to those shown in Patent No. 2,237,705, issued April 8, 1941, to E. F. Kohl. Each set comprises insulators, such as 47, a pair of stop spring contacts, such as 41 and 43, a movable spring contact, such as 42, a movable armature spring, such as 44 and the curved portion 45 for engaging the armature sleeve 31 of the armature, a toggle spring, such as 46, and a plate 48 with screws 49 for securing the assembled set to the base 24.

Figure 2:
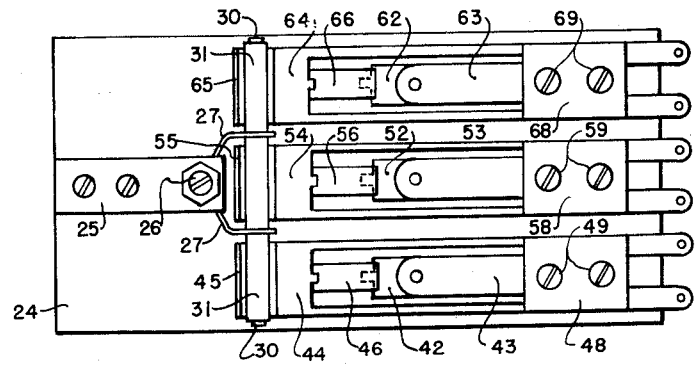
Fig. 2 shows a top view, Fig. 3 an end view partly in section and Fig. 4 a side view of the voltage responsive magnet equipped with snap-acting contacts of the toggle type which is diagrammatically illustrated in Fig. 1.
Figure 3:
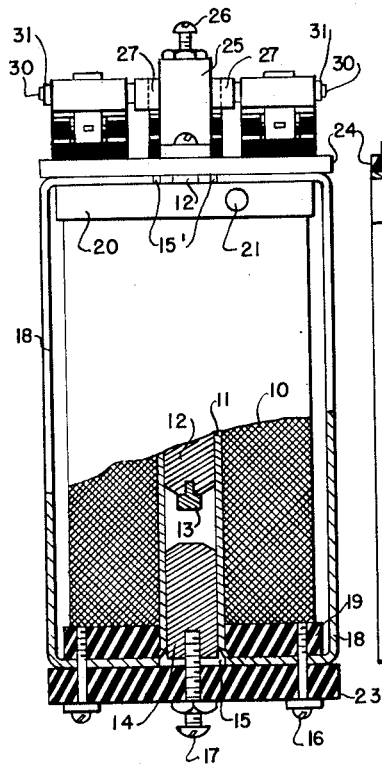
Figure 4:
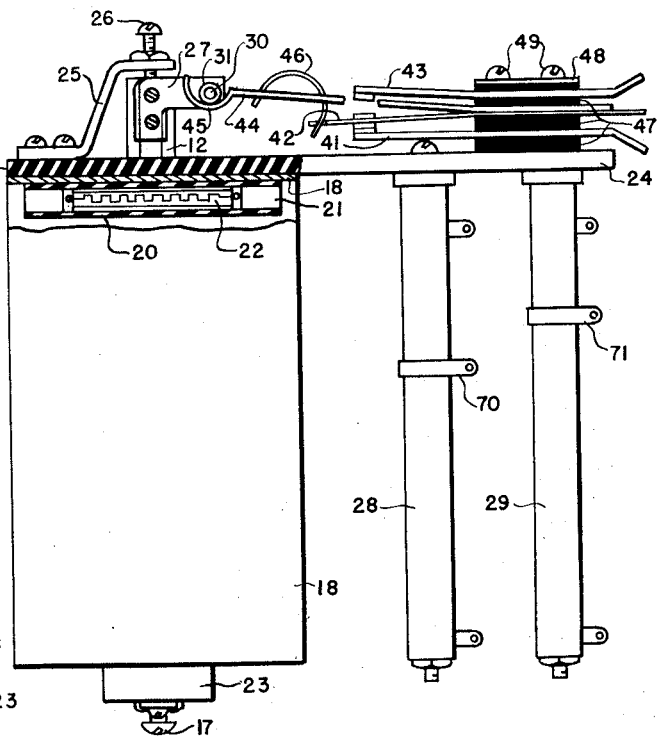

The battery charging system shown in Fig. 1 diagrammatically shows the voltage responsive relay, or magnet, together with its snap-acting spring contact sets and the variable resistors shown in Figs. 2, 3 and 4. In addition Fig. 1 shows a transformer T, a source of current, a charging rectifier R, a storage battery SB, a negative temperature coefficient resistor 73, resistances 72 and 97, and conductors for the interconnections as shown. The negative temperature coefficient resistor 73 is enclosed in a glass tube and sealed so that the same may be immersed in the electrolyte of the storage battery.

The upper set of snap-acting springs is for controlling the start and stop charging circuits; the intermediate set is for controlling a reduced rate of charge; and the lower set is for controlling the magnet circuit so that the armature of the magnet will be operated in the manner more fully described hereinafter. Attention should be called to the stop contact springs 61 and 63 which are positioned a predetermined distance from each other. Stop contact springs 41 and 43 are similarly positioned but stop contact springs 51 and 53, as will be noted, are considerably closer to each other. The reason for these different settings will be apparent from the following detailed description.

It is well-known that, where snap-acting spring contacts of the toggle type are controlled by an armature of a magnet, the movable spring contacts are snapped from one stop contact position to its alternate stop contact position when the movable armature spring and the armature reach a predetermined position and that the movable spring contacts are snapped back from its alternate stop contact position to its said one stop contact position on the reverse stroke of the armature when the movable armature spring and armature reach a second predetermined position which is a different position of the armature than the said first mentioned predetermined position. It is also known that these two different predetermined positions of the armature at which the movable spring contacts snap from one stop contact position to its other stop contact position may be varied by adjusting the stop contact positions to be closer to each other or further apart from each other. For example, if these stop contact positions are adjusted fairly close to each other then the two predetermined points of the armature at which the snap action takes place is also fairly close to each other but as these stop contact positions are adjusted farther and farther apart the predetermined positions of the armature at which said snap action takes place are likewise correspondingly farther apart from each other. The stroke of the movable spring contact between stop contact positions is therefore one factor in determining the exact points at which the movable spring contacts snap from one stop contact position to its other stop contact position.

Another factor in determining the exact points at which the snap actions of the movable spring contacts take place is the amount of tension in each of the movable spring contacts with respect to the tension in their corresponding toggle spring. It is also known that the movable spring contact of the toggle type snaps from one position to its alternate position when the movable armature spring is moved in direct alignment with its movable spring contact and that the tension of the movable spring contact against the tension of the toggle spring determines the point above or below the direct alignment at which the movable spring contact snaps to its other position. For example, if there were no tension in the movable spring contact, then the springs would snap just beyond the direct alignment, while, with tension in the movable contact spring, the movable contact spring will snap further away from the direct alignment in accordance with the amount of tension in the movable spring contact.

It is therefore seen that by adjusting the stop contact positions thereby limiting the stroke, or movement, of the movable spring contact and by properly tensioning the movable spring contact of each contact set, the snap action of the movable spring contacts can be adjusted to take place at desired different predetermined positions of the armature. These different predetermined positions of the armature may vary for each snap-acting spring contact assembly, or set, used and therefore the different snap-acting spring contact sets may be used for starting and stopping a charge, for reducing the charging rate, and for directly controlling the circuits of the magnet.

The movable armature spring, or the spring which engages the armature, of each snap-acting contact set is tensioned to hold the armature in its retracted position. The amount of tension in the movable armature springs can be adjusted to the required amount without altering the predetermined positions in which the snap action takes place because the positions in which the snap action takes place depends upon the amount of tension in the movable spring contact and the alinement of the movable spring contact with respect to toggle spring and movable armature spring and not the amount of tension in the movable armature spring. The tension in these movable armature springs gradually increases on operation of the armature from its retracted position to its operated position due to the increase in stress. The tension in the toggle springs provides additional forces for retarding the movement of the armature during its downstroke until the springs snap to their alternate position. This additional, or toggle spring force, also gradually increases as the movable armature spring is being moved to a point near or directly in alignment with and opposite the movable spring contact because the toggle spring is being gradually compressed due to the points holding the ends of the toggle spring being moved closer and closer to each other. The tension in each movable armature spring and the above-mentioned cumulative increase in retarding force to the armature, developed by each movable armature spring and by each toggle spring as the armature is being moved, determines the positions to which the armature is moved for the different predetermined battery voltages.

In combination with the above-described mechanical adjustments, circuits, including variable resistances, have been provided for operating the magnet to move its armature to the above-mentioned predetermined positions to cause the snap-action of said spring contacts in response to the battery voltage reaching different predetermined values and for operating said magnet to release its armature to cause the switch contacts to snap back to their original positions in response to the battery voltage reaching still different predetermined values.

Fig. 5 diagrammatically illustrates on an enlarged scale of the upper set of contacts as shown in Fig. 1 with the armature in fully retracted position; it being understood that with insufficient current flowing in the winding 10 of the magnet the tension in the movable armature springs 64, 54 and 44 is sufficient to hold the armature in its retracted position as shown in Fig. 1. Fig. 5 is also applicable to the lower set of contacts of Fig. 1 since the stop contacts 41 and 43 are similarly set. Fig. 6 diagrammatically illustrates the upper and lower sets of contacts of Fig. 1 in their fully operated position. Figs. 7 and 8 diagrammatically illustrates the intermediate set of contacts in their fully retracted and fully operated positions, respectively.

In Figs. 5, 6, 7 and 8, the point P represents the point where the insulators 47 clamp the movable armature springs 64, 54 and 44 and clamp the movable spring contacts 62, 52 and 42 and the points P may be considered the pivot point for these springs. The stop spring contacts 63 and 61 are shown separated a predetermined distance while the stop spring contacts 51 and 53 are shown separated a lesser predetermined distance. The distance between 61 and 63 represents the stroke of the movable spring contact 62 and the distance between 51 and 53 represents the stroke of the movable spring contact 52. The toggle springs 66 and 56 correspond to the toggle springs 66, 56 and 46 shown in Fig. 1. The dotted lines diagrammatically illustrate the positions in which the movable armature springs and toggle springs are operated by the magnet armature, at which positions the snap-action of the springs takes place to snap them to their alternate positions.

The reference letters A, B, C, D, E, and F correspond, respectively to the different predetermined armature positions to which the armature of the magnet is operated in accordance with corresponding different predetermined voltage values of the storage battery. A corresponds to the fully retracted position of the armature, B to the reduced charge position, C to the charge cut-off (or float charge) position, D to the fully operated position, E to the start reduced charge position, and F to the full charge position. The distance from A to D corresponds to the full operating stroke of the armature of the magnet from its fully retracted position to its fully operated position.

It will now be assumed that the armature of the relay, or magnet, is in its fully retracted position A, as shown in Figs. 1, 5 and 7, and that the battery is receiving a charge. As the voltage of the storage battery is increased during a charge the armature is moved from its retracted position A towards its fully operated position D and moves the movable armature springs 64, 54, and 44 accordingly. The tension in the movable armature springs increases due to stress as the armature is being moved downward. Due to this increased tension, a gradual increase in voltage is required to continue the downward movement of the armature. The armature may move down through positions F and E without operating, or changing, any of the spring contact sets. If the voltage of the battery should fluctuate due to increased load, or other means, the armature would likewise fluctuate back and forth between A and E in accordance with the voltage of the battery.

Assuming that the voltage has been raised to a predetermined value then the armature will have moved from A to B. In Fig. 7, the movable armature spring 54 is shown in dotted lines in position B which is the critical point at which the intermediate spring set, shown in Fig. 1, snaps to its alternate position to cause the movable contact spring 52 to disengage stop contact spring 51 and engage stop contact spring 53. The operation of this set of contacts at this position reduces the charging rate as will be more fully described hereinafter. The armature may fluctuate somewhere between positions E and B, due to battery voltage fluctuations without any further changes in the spring sets. However, should the battery voltage drop sufficient to permit the armature to reach position E (shown in dotted lines in Fig. 8) then the critical operating point is reached to cause the intermediate spring set to snap back to the position shown in Fig. 1, thereby again causing the battery to be charged at the high rate.

Assuming that the voltage of the battery is gradually raised then the armature is moved from A to B as previously described to operate the intermediate spring set to reduce the charging rate. Now if the voltage continues to increase the armature continues to move downward from B to C and reaches position C at a different predetermined voltage value. The position C is the critical point at which the upper and lower spring sets shown in Fig. 1 snap to their alternate positions. The upper spring set operates its movable spring contact 62 to disengage from stop contact spring 61 and to engage stop contact spring 63 to completely cut off the charge. The lower spring set operates its movable spring contact 42 to disengage from stop contact spring 41 and to engage stop contact spring 43 to alter the operating circuit to the magnet as will be more fully described hereinafter. The armature is then moved to its fully operated position D as illustrated in full lines in Figs. 6 and 8. As long as the voltage of the battery is maintained at the desired value the armature is held in position D. However, if the voltage drops a sufficient amount the armature is released from position D and on its up stroke it passes through positions C and B without changing any of the spring contact sets. When position E is reached the intermediate spring set is snapped back to the position shown in Fig. 1 and when position F is reached the upper and lower spring sets also snap back to their positions shown in Fig. 1 after which the armature reaches its fully retracted position A. In this position of the spring contact sets, the full charging circuit is closed and the operating circuit for the voltage response magnet is closed as shown in Fig. 1. It should be noted that the snap action of the spring sets take place at predetermined armature positions on the downstroke and that such spring sets are not snapped back to their original positions at these same predetermined points on the up-stroke of the armature but that the armature must reach different predetermined points before the spring sets are snapped back to their original positions.

The operation of the battery charging system will now be described in detail in connection with Fig. 1. In Fig. 1 the armature of the voltage responsive magnet is shown in its fully retracted position, corresponding to position A of Figs. 5, 6, 7 and 8. In this position a circuit may be traced from the AC source, conductor 80, movable contact spring 62, stop contact spring 61, conductors 82 and 83, transformer T and conductor 81 back to the AC source. Due to this connection a circuit for charging the storage battery SB may be traced as follows: from transformer T, rectifier R, conductors 95 and 94, storage battery SB, conductors 91, 90 and 85, stop contact spring 51, movable contact spring 52, and conductor 84 to the transformer T. The operating circuit for the voltage responsive magnet may be traced as follows: from one terminal of the storage battery SB, conductor 91, where the circuit divides in two parallel paths; one path extending by way of conductor 90, resistor 29 and its adjustable slide 71, conductor 86, movable contact spring 42, stop contact spring 41 and conductor 87 to conductor 89; the other path extending through the resistor 28 and its adjustable slide 70 and conductor 88 to conductor 89; and from thence through the negative temperature coefficient resistor 22, winding 10 of the magnet, conductor 92, the negative temperature coefficient resistor 73, and conductors 93 and 94 to the other terminal of the battery SB.

It should be mentioned that the movable armature springs 64, 54 and 44 have sufficient tension against the armature to hold the contact sets and armature in the positions shown in Fig. 1 for a predetermined minimum battery voltage or less and that the resistances 28 and 29 are adjusted so that the armature is moved from its fully retracted position, such as A, when the voltage of the battery is increased over this predetermined minimum value by the charge. As the armature moves from position A on its downstroke, the tension of the movable armature springs against the armature increases correspondingly due to stress. In the particular embodiment being shown, the tension in the armature movable springs and the resistances included in the magnet circuit are set so that the armature will move to position B (Fig. 7) only when the voltage of the battery has been raised to a predetermined value. Before this position is reached the armature may fluctuate, due to voltage fluctuations, anywhere between A and B without operating any of the snap-acting spring sets. As soon as the predetermined battery voltage, corresponding to position B, is reached the armature is correspondingly moved to position B to cause the intermediate set of snap-acting springs to operate. Movable spring 52 is thereupon snapped to disengage stop contact spring 51 and to engage stop contact spring 53. The disengagement of stop contact spring 51 from movable contact spring 52 opens the short circuit around the resistance 72 thereby including this resistance in the charging circuit to the storage battery. Due to this resistance the rate of charge is now reduced.

The battery is now being charged at a reduced rate and no further change in the snap-acting spring sets takes place until the battery voltage is still further raised to a second predetermined value or unless the battery voltage drops to a still different predetermined value. For example, the armature may fluctuate between positions C and E, due to voltage fluctuations, without further operating any of the snap-acting spring sets. In case of voltage drops sufficient to permit the armature to be restored back as far as position E (Fig. 8) then the intermediate set of snap-acting springs are snapped back to their original positions, shown in Fig. 1, to again short circuit the resistance 72 to permit the high-rate charging circuit to be effective. In case the voltage does not drop, as just explained, and gradually rises in response to the reduced charging rate, then the armature is moved to position C (Fig. 5) in response to the battery voltage reaching the said second predetermined value. The upper and lower sets of snap-acting springs are operated to their alternate positions in response to the armature reaching position C. In the upper set of springs, movable contact spring 62 disengages from stop contact spring 61 to open the circuit from the AC source to the transformer to cut off the charge.

The move contact spring 42 in the lower set of snap-acting springs, operates in response to the armature reaching position C to disengage from stop contact 41 thereby disconnecting the parallel resistance 29 from in circuit with the magnet winding 10. The circuit for the magnet winding 10, now includes only the resistance 28 instead of both resistances in parallel. The armature continues to position D after tripping the upper and lower spring sets. As long as the battery voltage is maintained at the said second predetermined value, or above, the armature of the magnet is held in its fully operated position D over the latter magnet circuit which excludes the resistance 29. The resistance value of resistance 28 is such as to maintain the armature in fully operated position D until the voltage drops to a certain predetermined value. When this occurs the armature is released from its fully operated position D and returns to its fully retracted position A. The armature passes through positions C and B without restoring any of the snap-acting contact spring sets. When position E is reached the intermediate snap-acting spring set is operated back to its original position shown in Fig. 1 and when position F is reached the upper and lower snap-acting spring sets also operate back to their original positions shown in Fig. 1. The original circuits first traced for Fig. 1 are now restored and the battery again is receiving the full rate charge. From here on the system continues to operate in the same manner as previously described.

The purpose of the negative coefficient resistor 22 is to compensate for the increase in resistance of winding 10 as the temperature of the winding increases. It will be noted that the resistor 22 is placed in close proximity to the center portion of the magnet so that such resistor will have approximately the same temperature as winding 10. As is well-known, the resistance of winding 10 increases with temperature increases and the resistance of a resistor, such as resistor 22, decreases with temperature increases. This arrangement, therefore, maintains the resistance in the magnet circuit at a fairly constant value.

The purpose of the negative coefficient resistor 73 is to increase or decrease the resistance in the magnet circuit in accordance with the temperature of the electrolyte of the battery, so that the magnet operates for different battery voltages dependent upon the temperature change of the battery. The resistance of resistor 73 also decreases with temperature increases. With this resistor in the magnet circuit, the magnet will be operated in response to a predetermined voltage of the battery for a given temperature. For lower battery temperatures, the magnet will be operated in response to battery voltages above said predetermined value above referred to because the resistor increases its resistance in proportion with said lower battery temperatures. In case the temperature of the battery rises to a point which is harmful to the battery the resistance of the resistor is reduced considerably thereby permitting the magnet to operate on lower voltages to cut off or reduce the charge.

It is known that when the temperature of a battery is low, each battery cell should be charged to a higher voltage than is required for a battery having a higher temperature.

The following chart illustrates the effect of temperature changes on the voltage requirements of a fully charged battery wherein the voltages, per cell, specified below, are reached for the specific temperatures of the battery listed below before the battery is fully charged:

*Typical voltage and temperature chart at 2-amp. charge*

| Temperature of batt. | Voltage per cell for full charge |
|---|---|
| | Volts |
| 10 degrees | 2.80 |
| 20 degrees | 2.76 |
| 40 degrees | 2.68 |
| 50 degrees | 2.63 |
| 70 degrees | 2.56 |
| 80 degrees | 2.50 |
| 90 degrees | 2.44 |
| 100 degrees | 2.40 |
| 120 degrees | 2.33 |

The negative temperature coefficient resistor 73 changes the resistance in the circuit to the magnet so that the magnet will only respond to the above battery voltages at the corresponding temperatures listed above.

Having described the invention, what is considered new and is desired to be protected by Letters Patent is set forth in the following claims.

What is claimed is:

1. In a battery charging system, a battery, a circuit for charging said battery, a voltage responsive relay having a winding, a circuit bridging said winding across said battery, switching contacts on said magnet for controlling said charging circuit and said bridged circuit, said contacts being biased to an unactuated position and having an actuated position, an armature on said magnet, means for moving said armature to different positions by said winding in response to different voltages of said battery, and means for moving said contacts from said unactuated position to said actuated position in response to said armature reaching a predetermined position and the battery voltage rising to a predetermined maximum value, for maintaining said contacts in actuated position irrespective of armature fluctuations in response to maintaining battery voltage fluctuations above a predetermined minimum value, and for restoring said contacts to unactuated position in response to said armature reaching a different predetermined position and said battery voltage decreasing to said predetermined minimum value.

2. In a battery charging system, a battery, charging means, a source of current, a first circuit connecting said source to said charging means to operate said charging means, a second circuit for connecting said charging means to said battery for charging said battery during operation thereof, a voltage responsive relay having a winding, a third circuit bridging said winding across said battery, a first, a second, and a third set of snap-acting switching contacts on said relay, said first set being included in said first circuit to control the operation of said charging means, said second set being included in said second circuit to control the rate of charge to said battery, and said third set being included in said third circuit to control the operation of said relay, an armature on said relay, means for moving said armature to different predetermined positions in response to the voltage of said battery reaching different predetermined voltages, a resistance, said second set being operated by said armature in response to said armature reaching a first predetermined position during a charge to include said resistance in said second circuit to thereby reduce the charging rate in said second circuit, said first and third sets being operated by said armature in response to said armature reaching a second predetermined position during a charge, said first circuit being interrupted in response to the operation of said first set to disconnect said source from said charging means to cut off the charge, means excluded from said third circuit in response to the operation of said third set for altering said third circuit to enable said relay to release said armature in response to a third predetermined battery voltage, and means for restoring said armature in response to the battery voltage decreasing to said third predetermined battery voltage to restore said sets to their original positions to restart the charge.

3. In a battery charging system, a battery charging circuit, an electro-magnet, a circuit connecting said electro-magnet across the battery in series with a pair of parallel resistances for operating said electro-magnet and for predetermining the point of battery voltage at which said magnet operates to cut off a charge, contacts being operated by said magnet for disconnecting one of said parallel resistances from said magnet circuit to reduce the current flow in said magnet for predetermining the point of battery voltage at which said magnet releases to start a charge, and other contacts being operated by said magnet for opening and closing said battery charging circuit in response to the operation and release of said magnet.

4. In a battery charging system, a storage battery and means for charging said battery, a battery responsive relay, snap-acting contacts on said relay having a charge control position and a cut-off position, means including a circuit and said relay for actuating said contacts from charge position to cut-off position in response to the battery voltage rising to a predetermined maximum voltage and for thereafter actuating said contacts from cut-off position to charge position in response to the battery voltage decreasing to a predetermined minimum voltage, and means included in said circuit and associated with the electrolyte of said battery for altering the resistance in said circuit in response to changes of temperature of said electrolyte to thereby alter said predetermined maximum and minimum battery voltages at which said relay actuates said contacts.

5. In a battery charging system, a battery and means for charging said battery, a battery voltage responsive relay of the solenoid type having a plunger movable to different predetermined positions in response to different predetermined battery voltages, a snap-acting toggle switch being operated by said plunger in only one of said predetermined positions of said plunger while said plunger is being moved in response to voltage variations during a charge and being operated by said plunger in only a different one of said predetermined positions of said plunger while said plunger is being moved in response to voltage variations during a noncharge period, a first circuit including said battery, said relay and said snap-acting toggle switch for controlling the operation of said relay during a charge, and a second circuit including said battery, said relay and excluding said snap-acting toggle switch for controlling the operation of said relay during a noncharge period.

6. In a battery charging system, a battery, a source of power, charging means, a first circuit for connecting said source to said charging means to operate said charging means, a second circuit for connecting said charging means to said battery for charging said battery, a battery responsive relay having an armature, circuit means including the winding of said relay and said battery for operating said armature to a first predetermined position in response to the voltage of said battery reaching a first predetermined voltage, for operating said armature to a second predetermined position in response to the voltage of said battery reaching a second predetermined voltage, for operating said armature to a third predetermined position in response to the voltage of said battery reaching a third predetermined voltage, and for operating said armature to a fourth predetermined position in response to the voltage of said battery reaching a fourth predetermined voltage, a first set of snap-acting contacts included in said first circuit, a second set of snap-acting contacts included in said second circuit, means for operating said first set of contacts from closed to open circuit condition to stop the charge in response to said armature reaching said first predetermined position and for operating said first set of contacts from open to closed circuit condition to stop the charge in response to said armature reaching said fourth predetermined position, means for operating said second set of contacts from closed to open circuit condition in response to said armature reaching said second predetermined position and for operating said second set of contacts from open to closed circuit condition in response to said armature reaching said third predetermined position, and means being excluded from said second circuit for reducing the charging rate in response to said second set of contacts being operated to open circuit condition and being included in said second circuit for restoring the full charging rate to said second circuit in response to said second set of contacts being operated to closed circuit condition.

7. In a battery charging system, a battery, a source of power, charging means, a first circuit for operating said charging means, circuit means for charging said battery, a voltage responsive relay having an armature, a second circuit including the winding of said relay and said battery for operating said armature to a first predetermined position in response to the voltage of said battery rising to a first predetermined voltage and for operating said armature to a second predetermined position in response to the voltage decreasing to a second predetermined voltage, a first set of snap-acting contacts included in said first circuit having a closed position for connecting said source to said charging means to operate said charging means and having an open position for opening said first circuit to disconnect said source from said charging means to stop the charge, a resistance, a second set of snap-acting contacts included in said second circuit having a closed position for including said resistance in said second circuit and having an open position for excluding said resistance from said second circuit to thereby change the resistance value in said second circuit, and means for operating said first and second sets of contacts from their closed positions to their open positions in response to said armature reaching said first predetermined position and for operating said first and second sets of contacts from their open positions to their closed positions in response to said armature reaching said second predetermined position.

RALPH T. WILLIAMS.